(12) United States Patent
Bonn

(10) Patent No.: US 6,491,319 B2
(45) Date of Patent: Dec. 10, 2002

(54) STEERING WHEEL ASSEMBLY AND A SWITCHING DEVICE THEREOF

(75) Inventor: Helmut Bonn, Haibach (DE)

(73) Assignee: TAKATA-Petri AG, Aschaffenburg (DE)

( * ) Notice: Subject to any disclaimer, the term of this patent is extended or adjusted under 35 U.S.C. 154(b) by 0 days.

(21) Appl. No.: 09/938,552

(22) Filed: Aug. 27, 2001

(65) Prior Publication Data

US 2002/0041087 A1 Apr. 11, 2002

Related U.S. Application Data

(63) Continuation of application No. PCT/DE00/00673, filed on Feb. 28, 2000, now abandoned.

(30) Foreign Application Priority Data

Feb. 26, 1999 (DE) .......................................... 199 08 385

(51) Int. Cl.$^7$ ............................. B60R 21/20; H01H 1/02
(52) U.S. Cl. ..................... 280/731; 200/61.55; 200/511
(58) Field of Search ............................. 280/731, 728.2, 280/728.3; 200/61.54, 61.55, 511

(56) References Cited

U.S. PATENT DOCUMENTS

| | | | |
|---|---|---|---|
| 4,172,216 A | * 10/1979 | O'Shea | ........................ 200/511 |
| 4,295,699 A | * 10/1981 | DuRocher | ................... 200/511 |
| 4,575,117 A | 3/1986 | Uchida | |
| 5,062,661 A | 11/1991 | Winget | |
| 5,239,147 A | 8/1993 | Allard et al. | |
| 5,410,114 A | 4/1995 | Furuie et al. | |
| 5,459,962 A | * 10/1995 | Bonne et al. | ............ 200/61.43 |
| 5,499,841 A | 3/1996 | Trojan et al. | |
| 5,767,466 A | 6/1998 | Durrani | |
| 5,908,203 A | * 6/1999 | Peterson | ..................... 280/731 |
| 5,920,044 A | * 7/1999 | Kaji et al. | ............... 200/61.44 |
| 6,079,737 A | 6/2000 | Isomura et al. | |

FOREIGN PATENT DOCUMENTS

| | | |
|---|---|---|
| DE | 43 44 615 C2 | 6/1994 |
| DE | 43 29 120 A1 | 3/1995 |
| DE | 693 06 338 T2 | 12/1996 |
| DE | 197 32 022 A1 | 2/1998 |
| DE | 198 01 514 A1 | 10/1998 |
| EP | 0 534 694 B1 | 3/1993 |
| EP | 0 568 764 A1 | 11/1993 |
| EP | 0 785 107 A1 | 7/1997 |
| FR | 1.110.551 | 2/1956 |

\* cited by examiner

Primary Examiner—Peter C. English
(74) Attorney, Agent, or Firm—Foley & Lardner

(57) ABSTRACT

A steering wheel assembly has an electrical switching device that can be used, for example, for activating a horn or any other electrically run devices. The electrical switching device includes first and second electrical contact elements. At least one of the first and second contact elements can be formed of an electrically conductive synthetic material and a metal conductor at least partially embedded therein. The synthetic material forms a contact surface. The steering wheel assembly includes a steering wheel base, an airbag module having a housing displaceable relative to the steering wheel base. The first contact element can be arranged on the base, and the second contact element can be arranged on either the base or the displaceable member. The housing can comprise a carrier for housing a gas generator and an airbag, and a cover connected to the carrier for covering the carrier. The second contact element can be arranged either on the base or on the carrier and/or the cover.

17 Claims, 5 Drawing Sheets

STEERING WHEEL ASSEMBLY AND A SWITCHING DEVICE THEREOF

This is a continuation of International Application PCT/DE00/00673 having an international filing date of Feb. 28, 2000, now abandoned. This international application was not published in English, but in German, as WO 00/50264.

BACKGROUND

Motor vehicles use horns to warn other drivers and pedestrians. The driver typically presses the center part of the vehicle steering wheel to active the horn. Pressing the center part moves a portion of the steering-wheel/airbag cover to close a mechanical switching device. Because the steering wheel also houses an airbag assembly for protecting the driver during a collision, the arrangement for closing the switching device can become complicated. The airbag assembly creates problems because it is arranged between the cover and the switching device for activating the horn.

In this respect, German patent publication DE 197 32 022 discloses integrating the switching device with the airbag cover. Here, the switching device is formed by a contact arranged on the upper edge of a container accommodating the airbag assembly, and an opposite contact arranged on the underside of a web projecting from the airbag cover and directed toward the container edge. The web supports the airbag cover on the upper edge of the container using compression springs. In this arrangement, the driver can no longer directly activate the horn. This arrangement uses a lower switching current for improved electromagnetic compatibility. But with a lower switching current, voltage spikes from metal contacts of the switching device closing can interfere with the operation. That is, when voltage spikes appear, electrical components, such as horns, cannot be reliably activated.

To solve this problem, a piezoelectric contact film has been proposed. The film can be arranged between the airbag cover and the airbag so that the horn can be activated in the usual way by axially pressing the central area of the airbag cover. Examples of this solution are disclosed in EP 534 694 B1, U.S. Pat. No. 5,499,841, DE 43 29 120 A1, and EP 568 764 A1. This solution, however, is relatively expensive because application of the piezoelectric material is relatively expensive.

Other solutions involve incorporating an electronic device for detecting and correcting the voltage spikes. This too is expensive since a sub-assembly is needed. Accordingly, there is a need for a reliable horn activation device without the above-identified drawbacks. The present invention addresses this need.

SUMMARY OF THE INVENTION

The present invention relates to a steering wheel assembly and an electrical switching device thereof, which can be used, for example, for activating a horn or any other electrically run devices.

One aspect of the invention is the electrical switching device, which includes first and second electrical contact elements. At least one of the first and second contact elements comprises an electrically conductive synthetic material and a metal conductor at least partially embedded therein, the synthetic material forming a contact surface. Both of the first and second contact elements can be made of electrically conductive synthetic material and metal conductor at least partially embedded therein, with their synthetic material forming contact surfaces of the first and second contact elements.

The synthetic material can be an elastomer, more preferably a thermoplastic elastomer. The synthetic material can contain conductive fillers, which can be carbon fibers. One or both of the first and second contact elements can be extruded or injection molded. One of the first and second contact elements can be formed of a sheet metal. The second contact element can be formed of a sheet metal.

Another aspect of the present invention is the steering wheel assembly, which includes a steering wheel base, a displaceable member displaceable relative to the steering wheel base; and the electrical switching device described above. The first contact element can be arranged on the base, and the second contact element can be arranged on one of the base and the displaceable member. Displacing the displaceable member electrically connects the first and second contact elements. The displaceable member can be an airbag module having a housing for holding an airbag and a gas generator. The housing can be displaceable relative to the steering wheel base. The housing can comprise a carrier for housing a gas generator and an airbag, and a cover connected to the carrier for covering the carrier. The second contact element can be arranged at least on one of the carrier and the cover.

According to one embodiment, the steering wheel assembly can have a third contact element movable with the housing relative to the first and second contact elements. Here, the third contact element can be configured to contact both the first and second conductive elements to electrically connect them. The third contact element can be electrically conductive. In this respect, the second contact element is arranged on the base next to the first contact element, and the housing has at least one conductive portion that contacts both the first and second contact elements.

According to another embodiment, the second contact element can be arranged on the housing and positioned so that at least a portion of the second contact element directly contacts a portion of the first contact element when the housing is displaced toward the base. That is, the second contact element can be displaceably mounted relative to the base so that the second contact element is movable relative to the first contact element. The second contact element can comprise at least one projection integrally formed with the housing. The housing can comprise a carrier for housing a gas generator and an airbag, and a cover connected to the carrier for covering the carrier. The second contact element can be arranged at least on the cover. Moreover, the second contact element can be arranged both on the cover and the carrier. Moreover, the second contact element can be arranged on a peripheral end of the cover. The steering wheel assembly can further include a protective element, such as elastic foam, for isolating at least one of the first and second contact elements from dust.

According to another embodiment, both the first and second contact elements can be arranged on the base. The second contact element can be spaced from the first contact element with a gap, and the housing can have at least one pushing portion configured to push the second contact element toward the first contact element when the housing is displaced toward the base. The switching device also can include a switching-element housing supporting both the first and second contact elements. The switching-element housing can be attached to the base. The switching-element housing can be non-conductive. The pushing portion can contact a portion of the switching-element housing. At least the portion of the switching-element housing that contacts the pushing portion can be elastically deformable.

The first or second contact element or both can be configured to be seated in a groove formed respectively on the base or the housing (either or both the cover and the carrier).

BRIEF DESCRIPTION OF THE INVENTION

DETAILED DESCRIPTION

Figure 1:
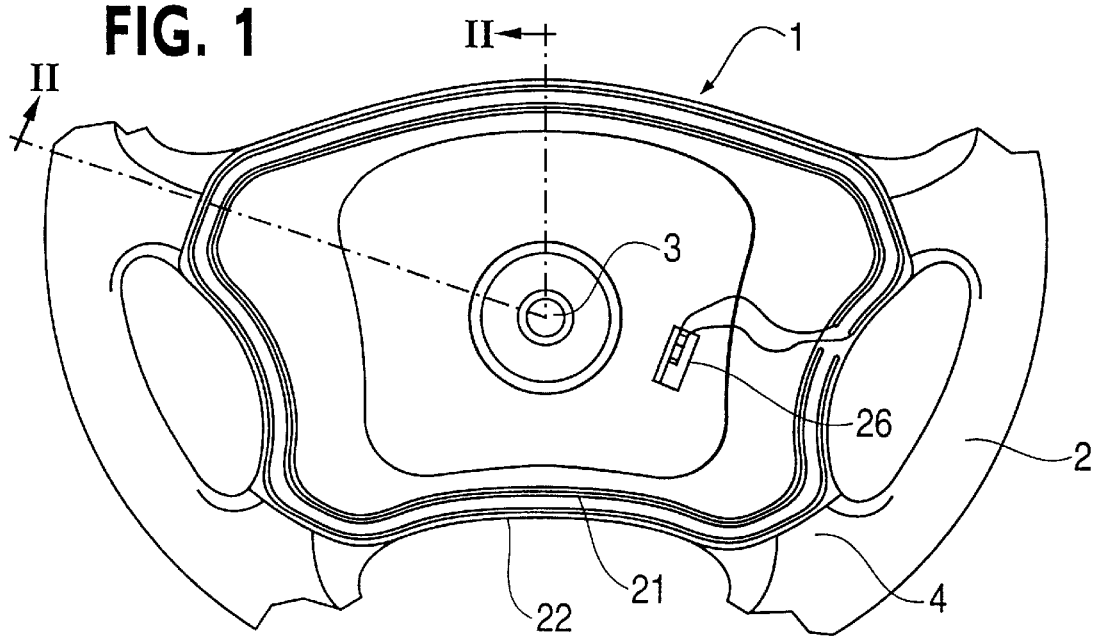
FIG. 1 shows a top view of a part of a steering wheel according to the invention having a switching device of the horn comprising two contact elements.
Figure 2:
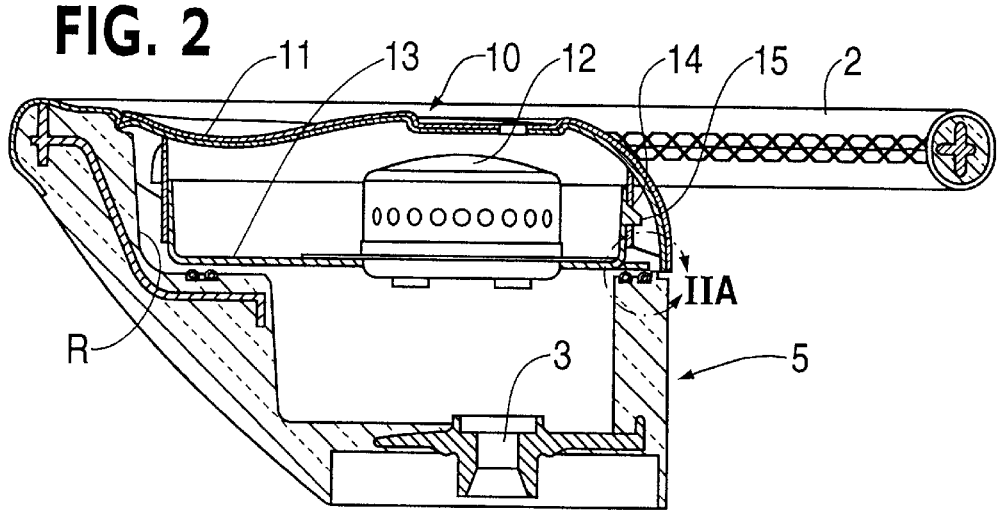
FIG. 2 shows a sectional view taken along line II—II of FIG. 1.

Referring to FIGS. 1 and 2, an embodiment (top view) of a steering wheel assembly 1 according to the present invention includes a steering wheel or rim 2, which is only partially represented for simplicity, and a steering wheel hub 3 attached to a steering wheel base 5, which is the portion that connects and/or carries the steering wheel spoke. The base 5 can be any structural part of the steering wheel assembly that carries the steering rim 2. A plurality of spokes 4 (four shown in the illustrated embodiment) connect the rim 2 to the base 5. The base 5 can be integrally formed with the spokes 4. The hub 3 is typically positioned at the center of the steering wheel 1.

The steering wheel 1 also includes a displaceable member. In the illustrated embodiment, the displaceable member is an airbag assembly or module 10 accommodated in a cavity or recess R formed at the base 5. The airbag assembly 10 includes a housing (11, 13) that encloses an airbag (not illustrated for clarity) and a gas generator 12. The housing includes a cover 11 and a carrier 13. The gas generator 12 is mounted to the carrier 13. The cover 11 forms a movable steering wheel section. The carrier 13 and the cover 11 can be connected to one another, for example, using recesses 14 and locking projections 15. One of the cover 11 and the carrier 13 can include the recesses and the other of the cover 11 and the carrier 13 can include the locking projections. In the illustrated embodiment, the cover 11 has the recesses 14 and the carrier 13 has the locking projections 15.

The housing 11, 13 is moveably positioned in the steering wheel base 5. A plurality of springs (not shown) can be used to bias the housing 11, 13 outwardly, that is axially outwardly away from the hub 3. The cover 11, along with the carrier 13, can be axially moved toward the hub 3, i.e., into the steering wheel base 5, to activate the horn. In this respect, the carrier 13 can include at least one conductive contact portion or element 23 for closing (i.e., electrically connecting or short circuiting) the horn circuit. The conductive portion 23 can be formed as outwardly or radially extending projections along one or more positions of the carrier 13, or as at least one continuous piece that extends along a predetermined peripheral length of the carrier 13.

The horn circuit includes an electrical switching device (21, 22), which can comprise two electrical contact elements 21, 22 positioned side-by-side. The contact elements 21, 22 can be electrically connected to a connector 26 positioned nearby the hub 3. The contact elements 21, 22 can be laid or positioned around the periphery of the recess R. See for example, FIG. 1, which shows the contact elements 21, 22 configured or arranged as an outer contact element 22 and an inner contact element 21 positioned substantially parallel to or concentric with the outer contact element 22 about the periphery of the recess R. In the embodiment shown in FIG. 1, both the inner and outer contacts elements 21, 22 are in the area opposing the bottom outer edge of the carrier 13 so that the conductive portion 23 can short circuit or contact the inner and outer contact elements 21, 22 when the cover is pushed into the recess R.

Figure 2A:
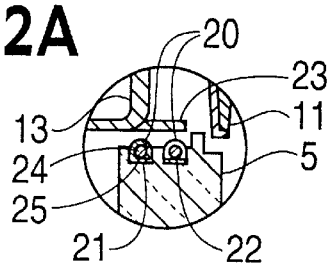
FIG. 2A shows an enlarged view of section IIA of FIG. 2.

Referring to FIGS. 1–2A, at least one conductive portion 23 is provided on the bottom outer periphery of the carrier 13, and acts as a switch or component for closing the switching contact elements when the cover 11 is pushed. Each of the inner and outer contact elements 21, 22 can comprise a copper strand or wire 24 embedded in a conductive synthetic material 25. The copper wire 24 enhances the conductivity, i.e., lowering the electrical resistance. When the operator depresses the cover 11, the entire airbag assembly 10 moves inwardly into the recess R, upon which the conductive portion(s) 23 presses onto the contact elements 21, 22 and short-circuits them, thereby closing the circuit and activating the horn.

Suitable synthetic materials include elastomers that deform, i.e., elastic, to improve or enlarge the contact surface between the contact elements 21, 22 and the conductive portion 23 when the operator depresses the horn, which in turn helps to improve the switching characteristics. The elasticity of the synthetic material also significantly reduces wear of the contact elements 21, 22. This not only enhances the longevity of the switching device, but also reduces contact noise. Preferred elastomers are EPDM (ethylene propylene diene monomer) or thermoplastic elastomers (TPE), thermoplastic polyester elastomers being especially preferred.

To make the synthetic materials conductive, conductive fillers, such as carbon fibers, graphite dust, or metal particles can be added. The proportion of the conductive fillers can be varied within wide limits and specially adapted to the particular application. The addition of carbon fibers in a proportion of 20 to 40% by weight is particularly preferred.

Since the contact elements 21, 22 extend along the entire periphery of the carrier 13, the conductive portion(s) 23 can short the contact elements 21, 22, at least along one or more contact points, even when the operator does not fully and cleanly depress the cover 11 in an axial direction.

Figure 3:
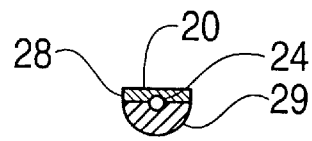
FIG. 3 shows a cross section of a contact element comprising conductive and non-conductive materials.
Figure 4:
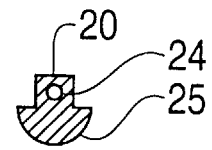
FIG. 4 shows a cross section of another embodiment of a contact element comprising a conductive synthetic material.
Figure 5:
FIG. 5 shows a cross section of another embodiment of a contact element comprising conductive and non-conductive materials.

FIGS. 3–5 illustrate cross-sections of various embodiments of the contact elements 21, 22. FIG. 4, which illustrates a preferred embodiment, has a substantially rectangular portion extending centrally upwardly from a semicircular portion from its diagonal. The conductive wire 24 is embedded in the rectangular portion, and the upper surface thereof forms a contact surface 20. This configuration is easy and inexpensive to manufacture, by extrusion or injection molding in corresponding molds, and easy to fit to the steering wheel base 5 and/or cover 11 or the carrier 13, or any other parts of the housing of the airbag assembly 10, by inserting or seating the contact element into a suitable groove. In this respect, either the conductive synthetic material or the material in which the groove is provided, or both, can be correspondingly elastic.

FIGS. 3 and 5 show different embodiments of the switching contact element 21, 22. Unlike the contact element 21, 22 of FIG. 4, the contact element of these embodiments comprises a conductive portion 28 and a non-conductive portion 29 positioned below the conductive portion 28. The metal conductive strand or wire 24 is embedded between the conductive and the non-conductive portions 28, 29, in contact with the conductive portion 28. The non-conductive portion comprises an elastic synthetic material configured to attach to the steering wheel base 5 and/or the carrier 13.

The non-conductive portion 29 in FIG. 3 has a substantially semicircular cross section that is connected to the conductive portion 28 at its flat area (diagonal). The non-conductive portion 29 in FIG. 5 corresponds to the profile of the embodiment of FIG. 4. It is of particular advantage here to use the same polymer or the same polymer compound both for the conductive profile portion 28 and the non-conductive portion 29, while rendering the conductive portion 28 conductive through the addition of carbon fibers.

Figure 6:
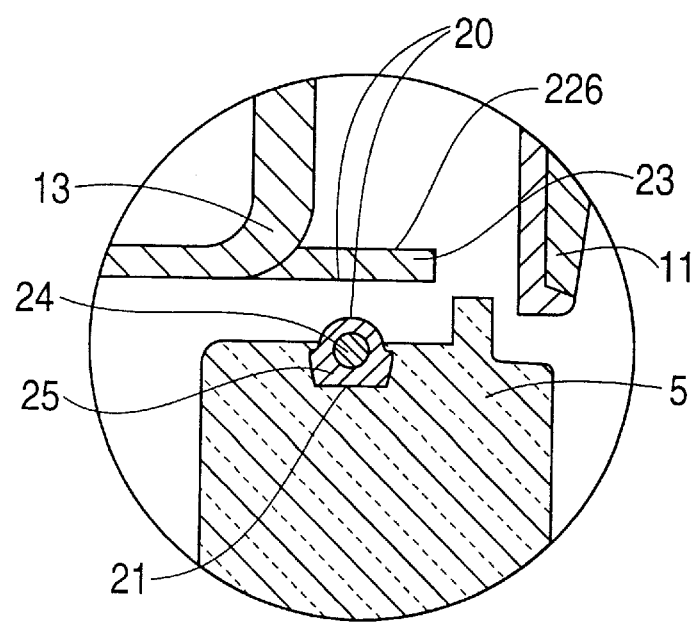
FIG. 6 shows a detailed view of yet another embodiment of the contact element comprising a sheet metal part.

FIG. 6 illustrates a detailed view similar to FIG. 2A, but showing another embodiment. In the embodiment of FIG. 6, the switching device includes a contact element 21 and a contact element 226. The contact element 21 is formed on the base, similar to the contact element 21 or 22 of FIGS. 1–2A, but the contact element 226 is formed on the carrier. The conductive portion(s) 23 of the carrier here forms the contact element 226. The conductive portion 23 can comprise a sheet metal, thus making this embodiment more cost effective. Also, the contact gap between the carrier 13 and steering wheel base 5 can be kept very small so that only a short carrier travel is necessary to activate the horn.

Figure 7:
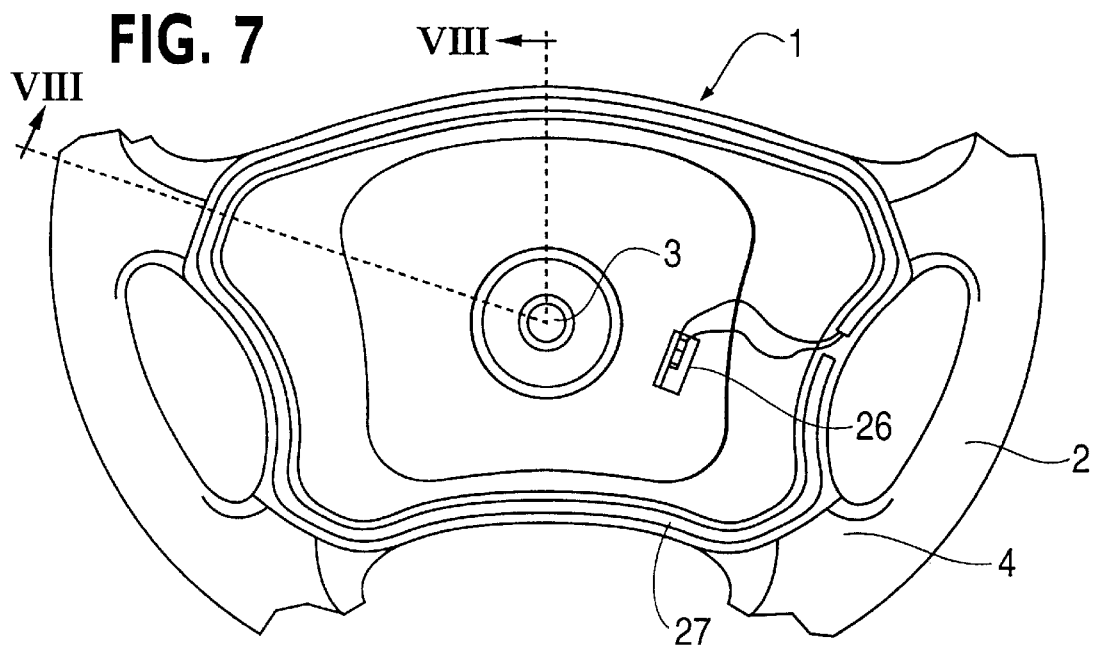
FIG. 7 shows a top view of another embodiment of a steering wheel according to the invention having a switching device of the horn comprising a nonconductive, elastic contact element.
Figure 8:
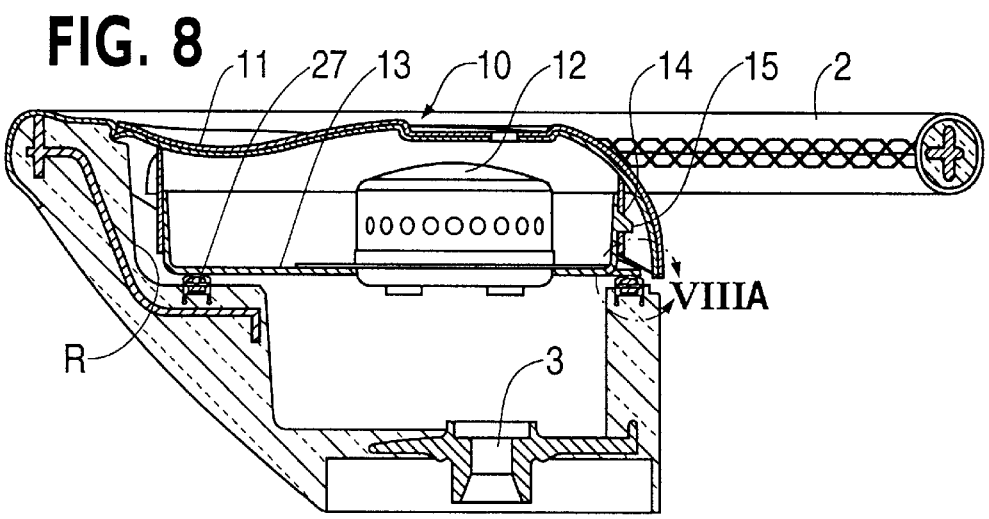
FIG. 8 shows a sectional view taken along line VIII—VIII of FIG. 7.
Figure 8A:
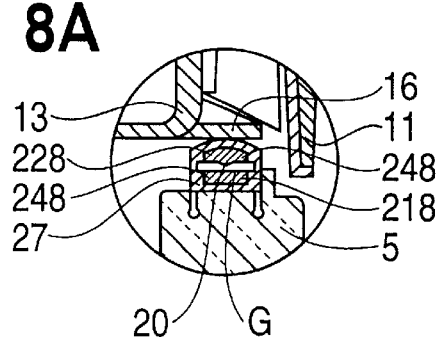
FIG. 8A shows an enlarged view taken along section VIIIA of FIG. 8.

The embodiment of a steering wheel 1 according to the invention shown in FIGS. 7–8A is substantially similar to that of FIGS. 1–2A. Here, however, the electrical switching device is a self-contained unit housing both the contact switching elements 218, 228. The switching device comprises an elastic housing 27 of a non-conductive synthetic material fixed to the steering wheel base 5. The housing 27 can have a chamber filled with a pair of opposing conductors 248 with a gap therebetween G. One of the contact elements 218, 228 comprises one of the conductors 248 and the other of the contact elements 218, 228 comprises the other of the conductors 248, which can be metal conductors. Moving the cover 11 and thus compressing the housing 27 closes the gap G between the conductors 248. The conductors 248 short circuit or contact each other by way of the conductive material of the contact elements 218, 228 and activates the horn.

The conductive portion(s) 23 formed in the embodiment of FIGS. 1–2A and 6 is electrically conductive. In the embodiment of FIGS. 7–8A, the same element, i.e., projection(s) or pushing portion(s) 16, need not be conductive since the contact element 218 is short-circuited by pressing the housing 27 and moving the upper contact element 228 toward the lower contact element 218 with the pushing portion(s) 16.

Figure 9:
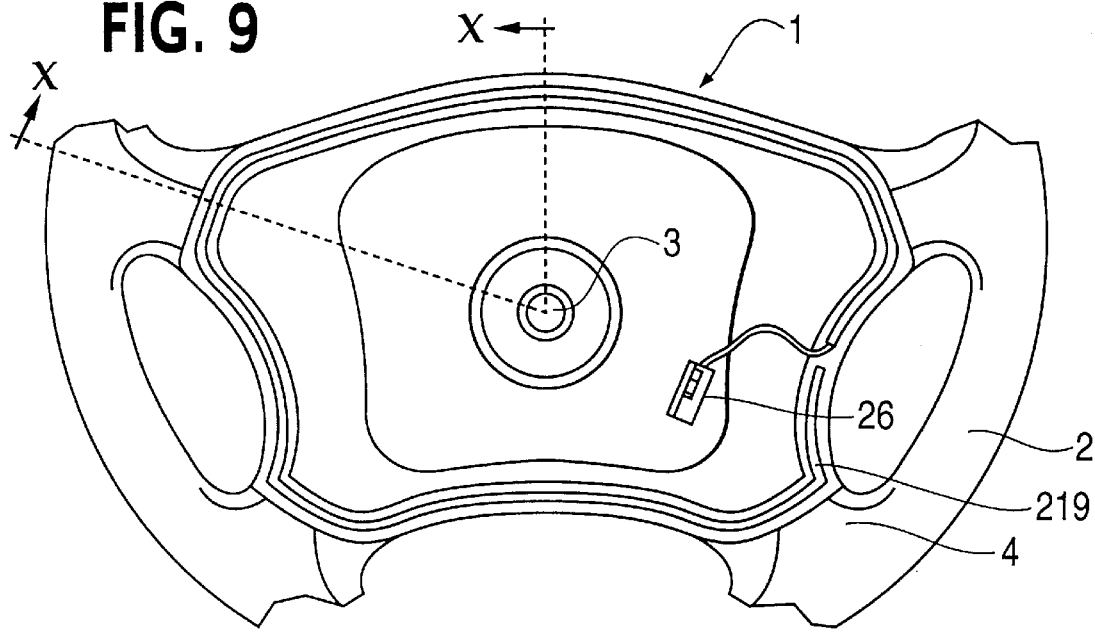
FIG. 9 shows a top view of yet another embodiment of a steering wheel according to the invention having a switching device of the horn comprising two contact elements.
Figure 10:
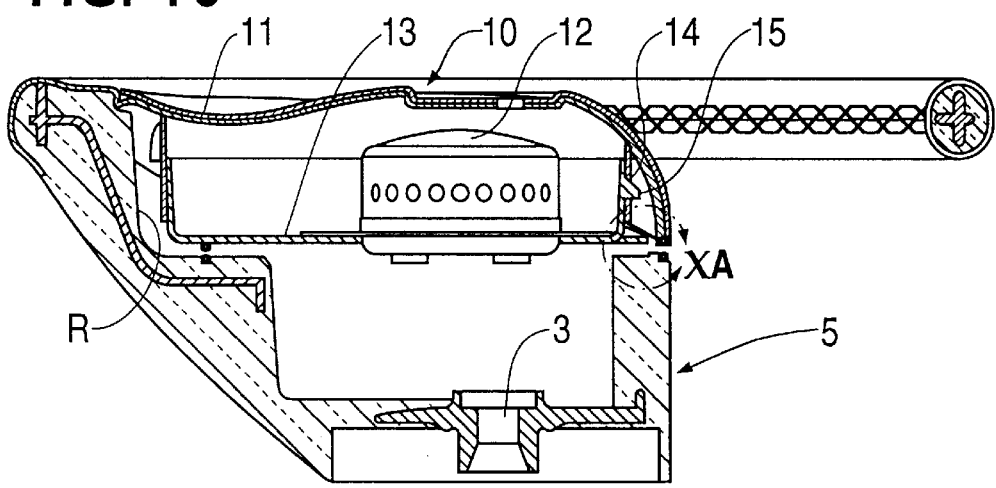
FIG. 10 shows a sectional view taken along line X—X of FIG. 9.
Figure 10A:
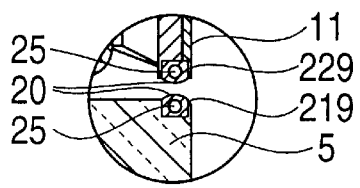
FIG. 10A shows an enlarged view taken along section XA of FIG. 10.

The embodiment of a steering wheel 1 according to the invention shown in FIGS. 9–10A is substantially similar to that of FIG. 6. Here, however, one of the contact switching elements 219, 229 is provided on the cover 11, as well as the carrier 13. In this embodiment, the lower contact element 219 is provided on the steering wheel base 5, as substantially described previously and illustrated in FIG. 1, and the opposite or upper contact element 229 on the cover 11 along its peripheral edge and along the bottom of the carrier 13. Only the contact element 219 is connected to the connector 26. In this embodiment, the projection (23, 16) is unnecessary. Instead, the horn is sounded by directly contacting of the contact elements 219, 229 when the cover 11 is pushed in or axially moved.

The cover 11 can have recesses 14, which serve for connecting the cover 11 and the carrier 13 so that the cover 11 can move relative to the carrier 13. This way the carrier 13 need not move. A separate movement of the cover 11 to operate the switching device is thus possible. The connection of the airbag assembly 10 to the steering wheel 1 may be of deformable design for improved protection of the vehicle occupant.

Figure 11:
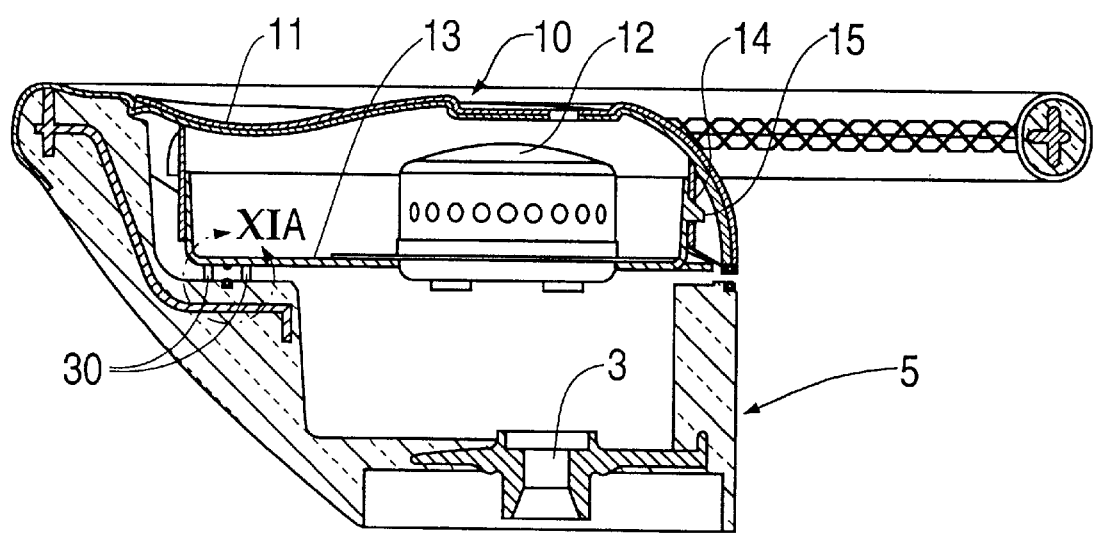
FIG. 11 shows a sectional view of yet another embodiment of a steering wheel according to the invention having a switching device of the horn comprising a contact element and a contact rivet.
Figure 11A:
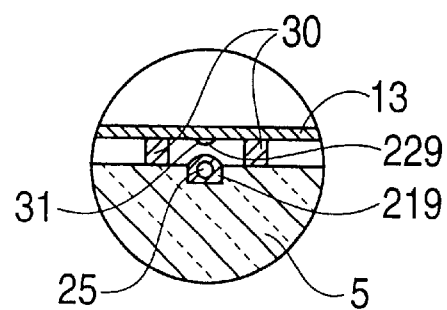
FIG. 11A shows an enlarged view taken along section XIA of FIG. 11.

FIGS. 11–11A depict an alternative to the embodiment shown in FIGS. 9–10A. Here, one of the contact elements, the upper contact element 229 as illustrated, comprises metal contact rivets 31. For protection from external contamination, especially dust, an annular, elastic foam body 30 can be arranged as a sealant between the steering wheel base 5 and the carrier 13 and around the contact rivets 31. The elasticity of the foam body 30 is sufficiently high to allow it to conform to the lower contact element 219 arranged on the steering wheel base 5, thereby outwardly sealing off the contact rivets 31 dust-tight. The foam body can be composed of an open-cell foam to ensure moisture ventilation and prevent any concentration of precipitated water.

The steering wheel assembly according to the present invention thus includes an electrical switching device having at least two electrical contact elements, which can be manually shorted or electrically connected by moving a section of the steering wheel assembly. At least one of the contact elements can have a section composed of an electrically conductive material, through which current can flow after activating the switching device.

At least one contact element can comprise an electrically conductive synthetic material, the outer contour of which can form the contact surface. In a variant, one contact profile can be provided for each of two contact elements. Designing as a contact profile is advantageous in that the switching elements can be continuously produced for more cost-effective manufacture and processing and ease of fitting. The electrically conductive synthetic material means that the contact elements, particularly the profile, can be easily configured or shaped. The entire contact profile can serve as a contact surface, which clearly increases the versatility of the arrangement. The contact element also can function as a sealing element for sealing the contact gap.

A metal conductor can be embedded in the contact profile. In addition to a metal strand other known materials, such as cables, for example, are also suitable as electrodes. The contact element can be entirely formed of conductive synthetic material. Metal conductors can be used only for the connection. The contact profile can be manufactured by extrusion or injection molding. This method of manufacture is particularly cost-effective and simple.

The contact elements also can be formed in a single self-contained unit or in a single profile. The two contact elements can be arranged inside an elastically deformable member or housing, which is non-conductive. The two contact elements can be spaced apart with a gap, which can be closed by deforming the deformable non-conductive member. Both contact elements can be embedded in a material, preferably synthetic material, having suitable flexibility and spaced apart with a gap. Arranging both contacts in a self-contained unit is simple and cost-effective.

The steering wheel assembly can have a component manually movable relative to the contact elements. This movable component can be used to short the two contact elements. Alternatively, one of the conductive elements can be movably mounted in the steering wheel assembly so that it can be moved into contact with the other contact element, which can be fixedly mounted to the steering wheel assembly. The movable component or conductive element can comprise a projection provided on the housing of the airbag assembly. The projection can serve here as means for activating the switching device.

The contact element can be configured to snap fit onto the base, carrier, cover, or the steering wheel. In this respect, the contact element can have grooves or projections along its longitudinal extent that cooperate with the complementary projections or grooves formed on the base or carrier or cover. The base in particular often has a layer of foamed plastic in the area in which the contact element is arranged, into which the contact element can snap fit. The contact elements can be readily installed using commercially available plug-and-socket connectors.

By arranging the contacts in the area of the outer edge of the cover in close proximity to the support points opposite to the steering wheel base, it is possible to reduce the distance between cover and steering wheel base, since there is no need to take account of the lever action when designing the contact gap. A reduced contact gap also reduces the distance between cover and steering wheel base.

The operating element in this case may be any means capable of transmitting the movement of the cover and activating the switching device. If the contact elements are arranged in the area of the edge of the cover, the switching device can be reliably activated, even if the cover is not moved centrally but rather at one side only. The axial mobility of the airbag cover in relation to the steering wheel can be achieved in a manner known in the art, for example by suspending the airbag assembly on the steering wheel using preferably three or more springs.

The conductive material can include a synthetic material. The section of conductive synthetic material can be connected in series with the other conductive element. Current thus can flow exclusively through the section with the electrically conductive synthetic material, not through any parallel conductors. In particular, metal conductor elements arranged in parallel thus can be eliminated.

The conductive synthetic material can be a conductive elastomer, such as a conductive polymer or polymer compound. Non-conductive polymers or polymer compounds can be rendered conductive through the addition of conductive materials, such as carbon fibers. In this case, the conductive fibers can be finely dispersed in the synthetic material, so that the formed material becomes conductive. The resistance or conductivity of the synthetic material can be varied through the selection and proportion of the conductive fillers.

Because the conductive synthetic material modifies the electrical resistance of the switching device, voltage spikes can be smoothed. Moreover, it is possible to switch currents easily and reliably without pronounced voltage spikes during switching. Through corresponding selection of the conductivity and the layer thickness of the synthetic material, the switching device can be optimally adapted to the respective application.

Another advantage is that the elasticity of elastomers leads to a significantly larger contact surface between the contacts of the switching device as the contact surface deforms or conforms to the profile of the opposite contact surface. This improves the switching reliability. The elastomers furthermore prolong the service life of the switching device by reducing the mechanical load, in comparison to metal contacts, which cannot elastically deform during their contact. A thermoplastic elastomer, for instance, particularly facilitates forming.

The switching device described here is not only suited for activating the horn, but can also be used for other electrically operable devices. Thus, it is feasible, for example, to also control the headlamp flasher by axial operation of the airbag cover. For example, the horn might be sounded by axial operation of the cover on one side and the headlamp flasher by axial operation on the opposite side of the cover.

The present invention provides an effective and inexpensive way of manufacturing a steering wheel with a switching device for reliably activating an electrical device.

The disclosures of the parent application, PCT/DE00/00673, and its priority application, DE 199 08 385.1, in their entirety, including the drawings, claims, and the specification thereof, are incorporated herein by reference.

I claim:

1. A steering wheel assembly comprising:
   a steering wheel base;
   a displaceable member displaceable relative to the steering wheel base, wherein the displaceable member is an airbag module having a housing for holding an airbag and a gas generator, the housing being displaceable relative to the steering wheel base;
   an electrical switching device comprising:
      first and second electrical contact elements, wherein the first contact element is arranged on the base, and the second contact element is arranged on the displaceable member, the first and second contact elements becoming electrically connected by displacing the displaceable member,
      wherein one of the first and second contact elements comprises an electrically conductive synthetic material and a metal conductor at least partially embedded therein, the synthetic material forming a contact surface; and
   wherein one of the contact elements is formed of a sheet metal.

2. A steering wheel assembly according to claim 1, wherein the second contact element is arranged on the housing and positioned so that at least a portion of the second contact element directly contacts a portion of the first contact element when the housing is displaced toward the base.

3. A steering wheel assembly according to claim 2, wherein the second contact element comprises at least one projection integrally formed with the housing.

4. A steering wheel assembly according to claim 2, wherein the second contact element is formed of a sheet metal.

5. A steering wheel assembly according to claim 1, wherein the housing comprises a carrier for housing a gas generator and an airbag, and a cover connected to the carrier for covering the carrier, the second contact element being arranged on the carrier.

6. A steering wheel assembly according to claim 1, wherein the first or second contact element is configured to be seated in a groove formed on the base or the housing.

7. A steering wheel assembly according to claim 1, wherein the synthetic material is an elastomer.

8. A steering wheel assembly according to claim 7, wherein the elastomer is a thermoplastic elastomer.

9. A steering wheel assembly according to claim 1, wherein the synthetic material contains conductive fillers.

10. A steering wheel assembly according to claim 9, wherein the conductive fillers are carbon fibers.

11. A steering wheel assembly according to claim 1, wherein at least the first contact element is extruded or injection molded.

12. A steering wheel assembly comprising:
a steering wheel base;
a displaceable member displaceable relative to the steering wheel base, wherein the displaceable member is an airbag module having a housing for holding an airbag and a gas generator, the housing being displaceable relative to the steering wheel base;
an electrical switching device comprising:
first and second electrical contact elements, wherein the first contact element is arranged on the base, and the second contact element is arranged on the base, the first and second contact elements becoming electrically connected by displacing the displaceable member,
wherein at least one of the first and second contact elements comprises an electrically conductive synthetic material and a metal conductor at least partially embedded therein, the synthetic material forming a contact surface; and
a third contact element movable with the housing relative to the first and second contact elements, the third contact element being configured to contact both the first and second contact elements to electrically connect them.

13. A steering wheel assembly according to claim 12, wherein the third contact element is conductive.

14. A steering wheel assembly according to claim 13, wherein both of the first and second contact elements comprise the electrically conductive synthetic material and the metal conductor at least partially embedded therein, the synthetic material forming contact surfaces for the first and second contact elements.

15. A steering wheel assembly comprising:
a steering wheel base;
a displaceable member displaceable relative to the steering wheel base, wherein the displaceable member is an airbag module having a housing for holding an airbag and a gas generator, the housing being displaceable relative to the steering wheel base;
an electrical switching device comprising:
first and second electrical contact elements, wherein the first contact element is arranged on the base, and the second contact element is arranged on the base, the first and second contact elements becoming electrically connected by displacing the displaceable member,
wherein at least one of the first and second contact elements comprises an electrically conductive synthetic material and a metal conductor at least partially embedded therein, the synthetic material forming a contact surface; and
wherein the second contact element is arranged on the base next to the first contact element, and the housing has at least one conductive portion that contacts both the first and second contact elements.

16. An electrical switching device for a steering wheel having a steering wheel base and a displaceable member including an airbag module having a housing for holding an airbag and a gas generator, the housing being displaceable relative to the steering wheel base comprising:
a first electrical contact element arranged on the base; and
a second electrical contact element arranged on the displaceable member, the first and second contact elements becoming electrically connected by displacing the displaceable member,
wherein at least one of the first and second contact elements comprises an electrically conductive synthetic material and a metal conductor at least partially embedded therein, the synthetic material forming a contact surface; and
wherein one of the contact elements is formed of a sheet metal.

17. An electrical switching device according to claim 16, wherein the first and second contact elements are adapted to activate a horn.

* * * * *